United States Patent [19]

Dyck

[11] 4,064,955

[45] Dec. 27, 1977

[54] VEHICLE WEIGHING SCALE

[75] Inventor: George J. Dyck, Saskatoon, Canada

[73] Assignee: Canadian Patents and Development Limited, Ottawa, Calif.

[21] Appl. No.: 721,824

[22] Filed: Sept. 9, 1976

[51] Int. Cl.² ........................................... G01D 19/02
[52] U.S. Cl. .................................. 177/134; 177/254; 177/255; 177/DIG. 9
[58] Field of Search .............. 177/255, 254, 133, 134, 177/135, DIG. 8, DIG. 9, 208

[56] References Cited

U.S. PATENT DOCUMENTS

| | | | |
|---|---|---|---|
| 3,082,834 | 3/1963 | Ellis | 177/134 |
| 3,354,973 | 11/1967 | Farquhar | 177/255 X |
| 3,658,143 | 4/1972 | Schwartz | 177/255 X |

Primary Examiner—Joseph W. Hartary
Attorney, Agent, or Firm—Ronald G. Bitner

[57] ABSTRACT

A scale for weighing vehicles in motion comprising a rigid load platform supporting structure having torque transmitting bars arranged around the perimeter thereof and a support and roller assembly associated with each end of each torque bar for low friction, and a single load cell operating with low vertical travel.

8 Claims, 5 Drawing Figures

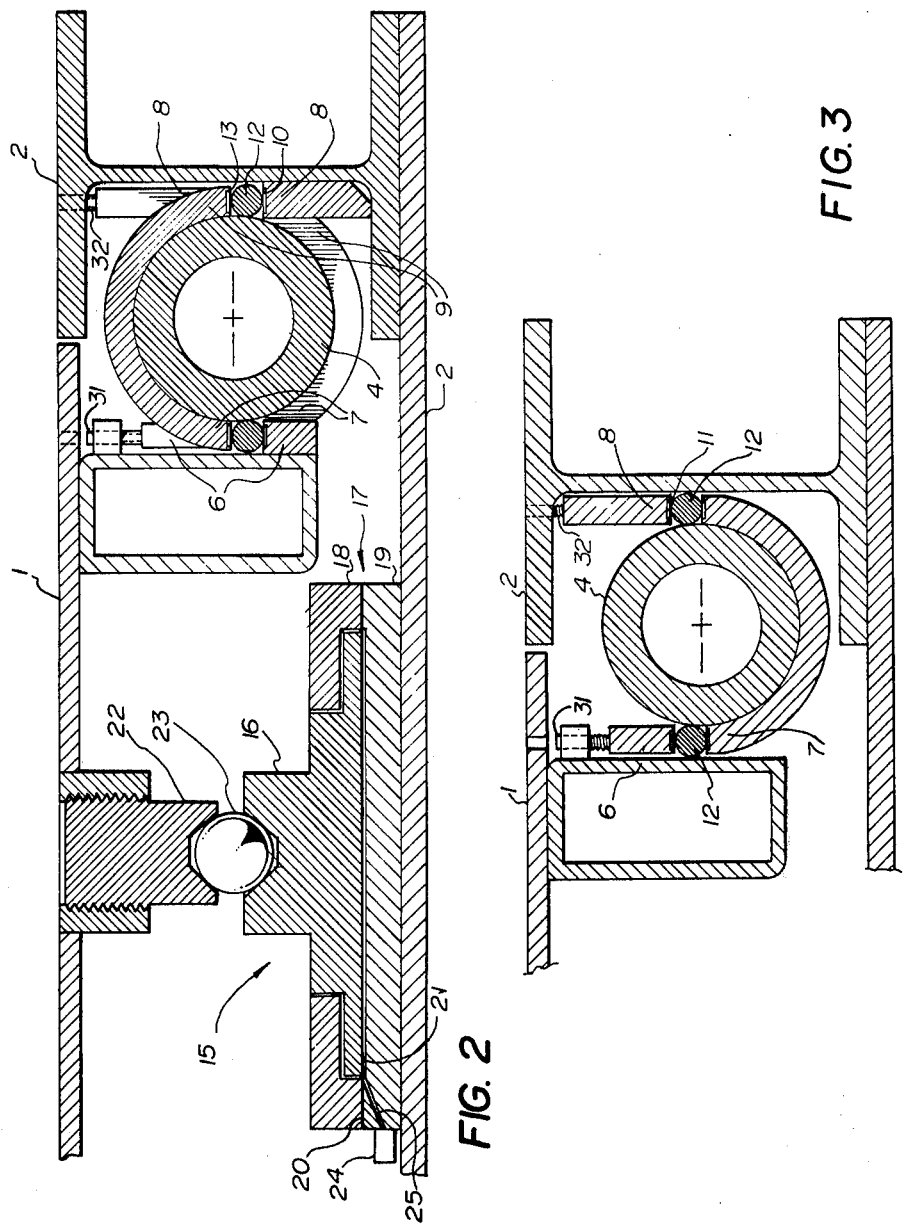

VEHICLE WEIGHING SCALE

BACKGROUND OF THE INVENTION

This invention relates to weighing scales and particularly to a scale for weighing vehicles in motion.

Most conventional scales are not suitable for weighing vehicles in motion. With increased speeds, accurate measurement becomes increasingly difficult as the time available for making a measurement becomes shorter. For example, with a two-foot long platform the time available for weighing a vehicle traveling at 60 miles per hour is approximately 23 milliseconds. Factors which contribute to response time of a scale include: deflections of the load platform under loading due to lack of rigidity of the platform supporting structure, friction in the interconnections linking the load platform and base structure, and vertical travel of the load platform for activating the load cell. Improved response time for vehicle scales is difficult to achieve since improvements in rigidity necessary for rapid response, tend to result in increased friction which slows response.

Prior to the present invention, applicant evaluated a number of platform supporting mechanisms which it was believed would provide the required rigidity. These included the use of four peripheral torque transmitting bars in conjunction with the following interconnecting mechanisms: pin and links, rack and gear, loop strap, and chain and sprocket. However, it was found that all of these would have too much friction to be suitable for weighing vehicles at high speed. U.S. Pat. No. 3,354,973 issued Nov. 28, 1967 to J. C. Farquhar illustrates mechanisms similar in principle to some of those previously evaluated.

At present there is no single load cell scale capable of weighing vehicles at high speed because of lack of platform rigidity and/or speed of response. Present scales designed for weighing vehicles in motion have four or more load cells. These load cells are either of the strain gauge or the Linear Variable Differential Transformer type. Usually this means that one load cell is placed at each corner or a scale and the vehicle driving over the scale progressively loads and unloads the load cells as the vehicles move across the platform. The process of sampling these multiple load cells and reconstructing the signal for final resolution has proven difficult and costly.

Prior hydraulic load cells are not suitable for highway weighing as they have too slow response due to high amounts of vertical travel. The prior load cells have diaphragms with rolled or folded edges and the elasticity of the diaphragm results in excessive vertical travel.

OBJECTS AND SUMMARY OF THE INVENTION

An object of the present invention is to provide a scale for weighing vehicles in motion.

Another object is to provide a scale capable of weighing vehicles at high speeds.

A specific object is to provide a vehicle weighing scale that has rapid response.

Another object is to provide supporting means for the load platform of a weighing scale having high rigidity.

Another object is to provide supporting means for the load platform of a vehicle weighing scale which has low friction.

Another object is to provide a weighing scale having low vertical travel of the load platform.

Another object is to provide a scale for moving vehicles employing a single load cell.

Another object is to provide a weighing scale that is sensitive over a wide range of loads.

Another object is to provide a rugged and reliable scale of relatively simple construction.

Another object is to provide a vehicle weighing scale that can be covered with asphalt without adversely affecting high speed weighing capabilities.

Another object is to provide a weighing scale that can be readily sealed from the environment.

Another object is to provide a hydraulic load cell, for a vehicle weighing scale, having low vertical travel and little friction.

The present invention provides a scale for weighing vehicles in motion comprising: a load supporting platform; a fixed base structure; means for interconnecting the platform with the base structure, allowing vertical motion of the platform, the interconnecting means comprising at least three torque transmitting bars arranged around the perimeter of the load supporting platform; and a support and roller assembly associated with each end of each torque transmitting bar, each of said support and roller assemblies comprising first, second, third, and fourth support element pairs, the first pair being attached to the platform, the second and third pairs being attached to horizontally opposite sides of the torque bar and the fourth pair being attached to the base structure, one of each pair having an upwardly facing bearing surface and the other of each pair having a downwardly facing bearing surface; and rollers disposed between adjacent upwardly and downwardly facing bearing surfaces of the first and second support element pairs, and between adjacent surfaces of the third and fourth pairs; and a load measuring device operating with low vertical travel disposed between the platform and the base structure.

The present invention further provides a hydraulic load cell suitable for weighing vehicles in motion.

BRIEF DESCRIPTION OF THE DRAWINGS

FIGS. 2 and 3 are sectional views taken at II—II and III—III, respectively, of FIG. 1.

DESCRIPTION OF PREFERRED EMBODIMENTS

Figure 1:
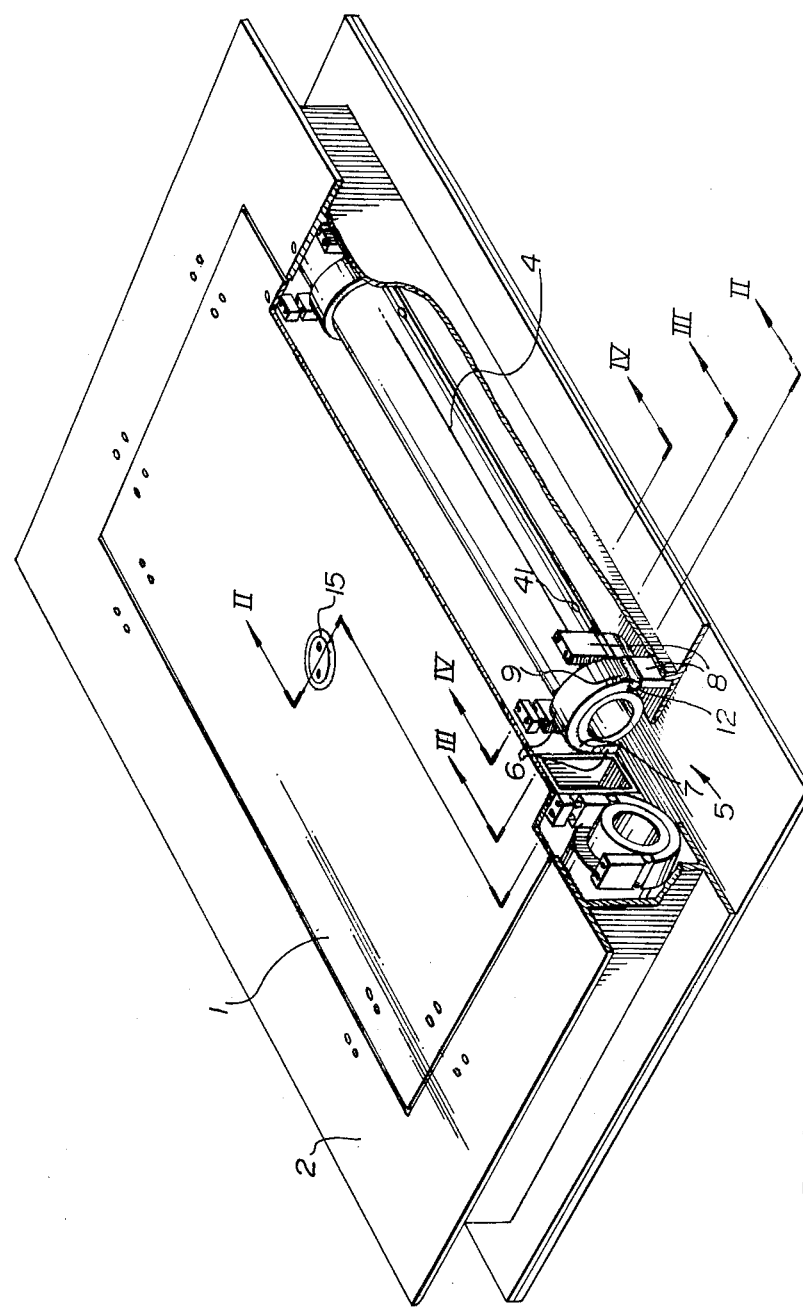
FIG. 1 is a fragmented perspective view of a scale in accordance with the present invention.

With reference to FIGS 1, 2 and 3, the weighing scale of the present invention comprises a load supporting platform 1 and a fixed base structure 2. The platform 1 is interconnected with the base 2 by torque transmitting bars 4 arranged around the perimeter of the platform 1, and support and roller assemblies 5, at least one assembly for each end of each torque bar 4. The interconnection of the platform 1 with the base 2 is such as to allow only vertical motion of the platform 1, and to allow such vertical motion with little resistance or friction.

Each of the support and roller assemblies comprises four support element pairs 6, 7, 8 and 9. Pair 6 is attached to the platform 1, pairs 7 and 9 to horizontally opposite sides of the torque bar 4, and pair 8 to the base 2. Each support element pair, for example 8, has an upwardly facing bearing surface 10 and a downwardly facing surface 11. Each of the bearing surfaces is shown disposed on wear resistant pad inserts mounted on the support elements 6, 7, 8 and 9. Rollers 12 are disposed between the adjacent upwardly and downwardly facing surfaces of the support element pairs 6 and 7, and between the adjacent surfaces of pairs 8 and 9. For example, referring to FIG. 2, one roller 12 is shown between the upwardly facing surface 10 of pair 8 and the adjacent downwardly facing surface 12 of pair 9.

Referring to FIG. 2, it will be noted that each of the support elements attached to the torque bar 4 is shown integrally connected with another support element on the opposite side of the torque bar in the form of a strap that surrounds one half of the torque bar. It will be understood that the support elements 7 and 9 need not be interconnected in this manner, but could be separate elements attached individually to the torque bar.

The support elements of each pair are shown offset longitudinally from one another along the torque bar. This allows all the bearing surfaces that are attached to the torque bar 4 to be on a common horizontal plane passing through the central axis of the torque bar, thereby minimizing horizontal forces due to vertical motion of the platform. The offset arrangement also facilitates provision for adjustment.

With reference to FIGS. 2 and 3, adjusting means 31 and 32 allow vertical adjustment of one of each of the support elements attached to the platform and base, respectively, to facilitate clearance of preload adjustment between the bearing surfaces and rollers.

Although the preferred embodiment shows a rectangular configuration for the scale, it will be appreciated that other configurations are possible, for example, a triangular shape with three torque bars.

For greater rigidity, additional support and roller assemblies may be placed at intermediate points between the ends of the torque bars.

The arrangement of the torque bars and the support and roller assemblies provides that the platform 1 remains horizontal with minimal deflection when a load is applied at any point on the platform and limits the platform to vertical motion with high precision and rigidity. The present use of rollers provides low friction or resistance to vertical travel of the platform providing high sensitivity over a wide range of loads. The high degree of rigidity and low friction make it possible to use a single centrally located load cell. At the same time, a single load cell reduces the complexity of the apparatus.

Referring to FIG. 2, a hydraulic load cell 15 is positioned between the platform 1 and the base structure 2. The load cell 15 comprises a piston 16 vertically movable within a cylinder 17 having an upper portion 18 and a base portion 19. A load on the platform 1 transmits force to the piston 16 through a vertically adjustable force transmitting member 22 and ball 23. The force on the piston 16 increases the pressure in the pressure chamber 21 which is measured by a suitable transducer 24 which communicates with the chamber by a passageway 25.

Figure 4:
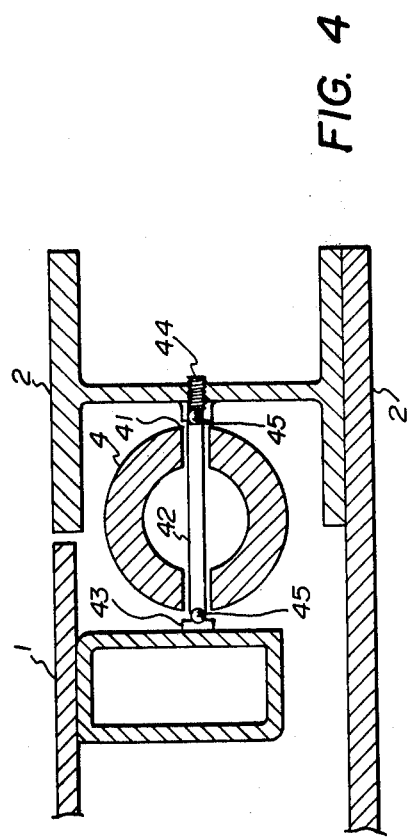
FIG. 4 is a sectional view taken at IV—IV of FIG. 1.

FIG. 4 shows details of means for centering the platform 1 and preventing horizontal movement thereof. A pin 42 and balls 45 pivotally interconnect the platform 1 and base structure 2 allowing vertical motion of the platform 1 with little added friction. Two such pins and ball assemblies are included on each of the four sides of the platform 1. The pin is seen passing through an aperture 41 in the torque transmitting bar 4. Horizontal adjustment is provided by the screw 44.

As indicated herein, in order to achieve the lowest possible response time, the vertical travel of the load cell should be as small as possible. With reference to FIG. 2, vertical travel of the piston 16, and hence platform 1, can be decreased by increasing the area of the piston. Reduced vertical travel of the piston 16 allows the use of a flat diagram 20, i.e. a diaphragm without folds or rolled edges, which minimizes elasticity, a cause of excess vertical travel. Decreased vertical travel of the piston 16 allows a reduction of depth of the pressure chamber 21 which minimizes temperature effects.

Preferably, the oil chamber 21 will contain a film of hydraulic fluid of about 0.005 inches in depth. With a 100 square inch piston-diaphragm arrangement, a 30,000 pound load can be read by a 300 psi transducer. The piston motion to fully activate the transducer would be less than .001 inch. The lower wall of the chamber 21 will preferably have a spiral groove or the like defining a passageway that connects with the passageway 25 leading to the transducer 24.

Figure 5:
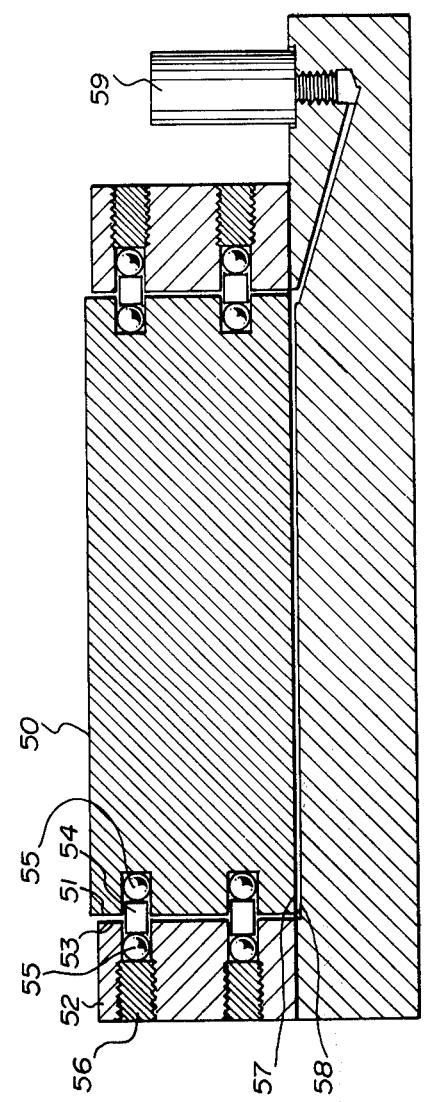
FIG. 5 is a sectional view of an embodiment of a load cell for weighing vehicles in motion.

FIG. 5 shows an embodiment of a hydraulic load cell including centering means which prevents the surface 51 of the piston 50 from engaging the wall 53 of the cylinder 52, reducing friction and centering the piston on the diaphragm. The centering means comprises a plurality of pins 54 disposed circumferentially around the piston. Associated with each pin are two balls 55 and an adjusting screw 56. FIG. 5 shows a number of the features discussed with reference to FIG. 2, including a shallow oil chamber 58 and a flat diaphragm 57.

The very low vertical travel makes it possible to cover and/or seal the scale for protection. For example, the entire structure as shown in FIG. 1 may be enclosed, utilizing a flexible sheet material on the top surface, thereby preventing contamination by dust, moisture, etc., and confining a lubricant for the pad and roller assemblies. Also, the scale may be covered by a flexible road surface material such as asphalt, making it possible to place the scale inconspicuously on a highway.

It will be appreciated that when weighing vehicles at higher speeds, the smoothness of the highway portion leading to the scale becomes more important since any irregularities cause transient perturbations in the vehicle suspension. It was found that an effective method of achieving smoothness was to resurface the highway for a distance of about 200 feet leading to the scale, the scale itself and for about 50 feet beyond the scale with a continuous mat of asphalt about 1 inch thick.

A scale similar to that shown in FIGS. 1 to 4 was constructed and a number of measurements were taken at speeds up to 55 miles per hour. The deviations from static weight were found to be less than 7%.

I claim:
1. A scale for weighing vehicles in motion comprising:
 a. a load supporting platform;
 b. a fixed base structure;
 c. means for interconnecting the platform with the base structure to allow vertical motion of the platform, the interconnecting means comprising at least three torque transmitting bars arranged around the perimeter of the load supporting platform, and a support and roller assembly associated with each end of each torque transmitting bar, each of said support and roller assemblies comprising first, second, third, and fourth support element pairs, the first support element pair being attached to the platform, the second and third pair being attached to horizontally opposite sides of the torque bar and the fourth pair being attached to the base structure, one of each support element pair having an upwardly facing bearing surface and the other of each pair having a downwardly facing bearing surface, and rollers disposed between adjacent upwardly and downwardly facing bearing surfaces of the first and second support element pairs, and between adjacent surfaces of the third and fourth pairs; and d. a load measuring device operating with low vertical travel disposed between the platform and the base structure.

2. The apparatus of claim 1 wherein the support elements of each pair are offset longitudinally from one another along the torque bar.

3. The apparatus of claim 2 wherein the bearing surfaces of the support elements attached to the torque bar are on a common horizontal plane passing through the central axis of the torque bar.

4. The apparatus of claim 1 wherein the load supporting platform is rectangular and includes four torque transmitting bars.

5. The apparatus of claim 1 including means for vertically adjusting one of each pair of support elements attached to the platform and the base.

6. The apparatus of claim 1 wherein the load measuring device comprises a hydraulic load cell.

7. The apparatus of claim 5 having a piston movably mounted in a cylinder and further comprising at least 3 pairs of pin and ball assemblies arranged circumferentially about the piston for preventing the surface of the piston from contacting the walls of the cylinder, each pin and ball assembly comprising a pair of balls and a pin, the balls of each pair pivotally engaging opposite adjacent portions of the piston surface and the cylinder wall, and said pin being pivotally disposed between said pair of balls.

8. The apparatus of claim 6 wherein the hydraulic load cell has a flat diaphragm.

* * * * *

UNITED STATES PATENT OFFICE
CERTIFICATE OF CORRECTION

Patent No. 4,064,955                      Dated December 27, 1977

Inventor(s) George J. Dyck

It is certified that error appears in the above-identified patent and that said Letters Patent are hereby corrected as shown below:

On the title page, under item /73/, the assignee's address reading "Ottawa, Calif.", should read --Ottawa, Canada--.

Signed and Sealed this

Sixteenth Day of May 1978

[SEAL]

Attest:

RUTH C. MASON
Attesting Officer

LUTRELLE F. PARKER
Acting Commissioner of Patents and Trademarks